(12) United States Patent
Egedal et al.

(10) Patent No.: US 11,585,323 B2
(45) Date of Patent: Feb. 21, 2023

(54) METHOD AND APPARATUS FOR COOPERATIVE CONTROLLING WIND TURBINES OF A WIND FARM

(71) Applicant: Siemens Gamesa Renewable Energy A/S, Brande (DK)

(72) Inventors: Per Egedal, Herning (DK); Peder Bay Enevoldsen, Vejle (DK); Alexander Hentschel, Vancouver (CA); Markus Kaiser, Munich (DE); Clemens Otte, Munich (DE); Volkmar Sterzing, Neubiberg (DE); Steffen Udluft, Eichenau (DE); Marc Christian Weber, Munich (DE)

(73) Assignee: SIEMENS GAMESA RENEWABLE ENERGY A/S

( * ) Notice: Subject to any disclaimer, the term of this patent is extended or adjusted under 35 U.S.C. 154(b) by 59 days.

(21) Appl. No.: 16/963,266

(22) PCT Filed: Jan. 16, 2019

(86) PCT No.: PCT/EP2019/051059
§ 371 (c)(1),
(2) Date: Jul. 20, 2020

(87) PCT Pub. No.: WO2019/145205
PCT Pub. Date: Aug. 1, 2019

(65) Prior Publication Data
US 2021/0363969 A1  Nov. 25, 2021

(30) Foreign Application Priority Data

Jan. 25, 2018 (EP) ..................... 18153414

(51) Int. Cl.
*F03D 9/00* (2016.01)
*H02P 9/04* (2006.01)
(Continued)

(52) U.S. Cl.
CPC .......... *F03D 7/048* (2013.01); *F03D 7/0292* (2013.01); *F03D 7/046* (2013.01);
(Continued)

(58) Field of Classification Search
CPC ........ F03D 7/0292; F03D 7/046; F03D 7/048; F05B 2270/32; F05B 2270/321; F05B 2270/325; F05B 2270/335
See application file for complete search history.

(56) References Cited

U.S. PATENT DOCUMENTS 8,839,656 B2 * 9/2014 Frederiksen ............ F03D 7/048
416/61
9,512,820 B2 * 12/2016 Obrecht ................ F03D 7/0204
(Continued)

FOREIGN PATENT DOCUMENTS

CN         1975155 A     6/2007
CN       102454544 A     5/2012
(Continued)

OTHER PUBLICATIONS

Farah Japar et al: "Estimating the wake losses in large wind farms: A machine learning approach", ISGT 2014, IEEE, pp. 1-5, XP032596179, DOI: 10.1109/ISGT.2014.6816427; [retrieved on May 15, 2014], the whole document; 2014.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

Provided is an apparatus and method for cooperative controlling wind turbines of a wind farm, wherein the wind farm includes at least one pair of turbines aligned along a common axis approximately parallel to a current wind direction and having an upstream turbine and a downstream turbine.
(Continued)

Figure 1:
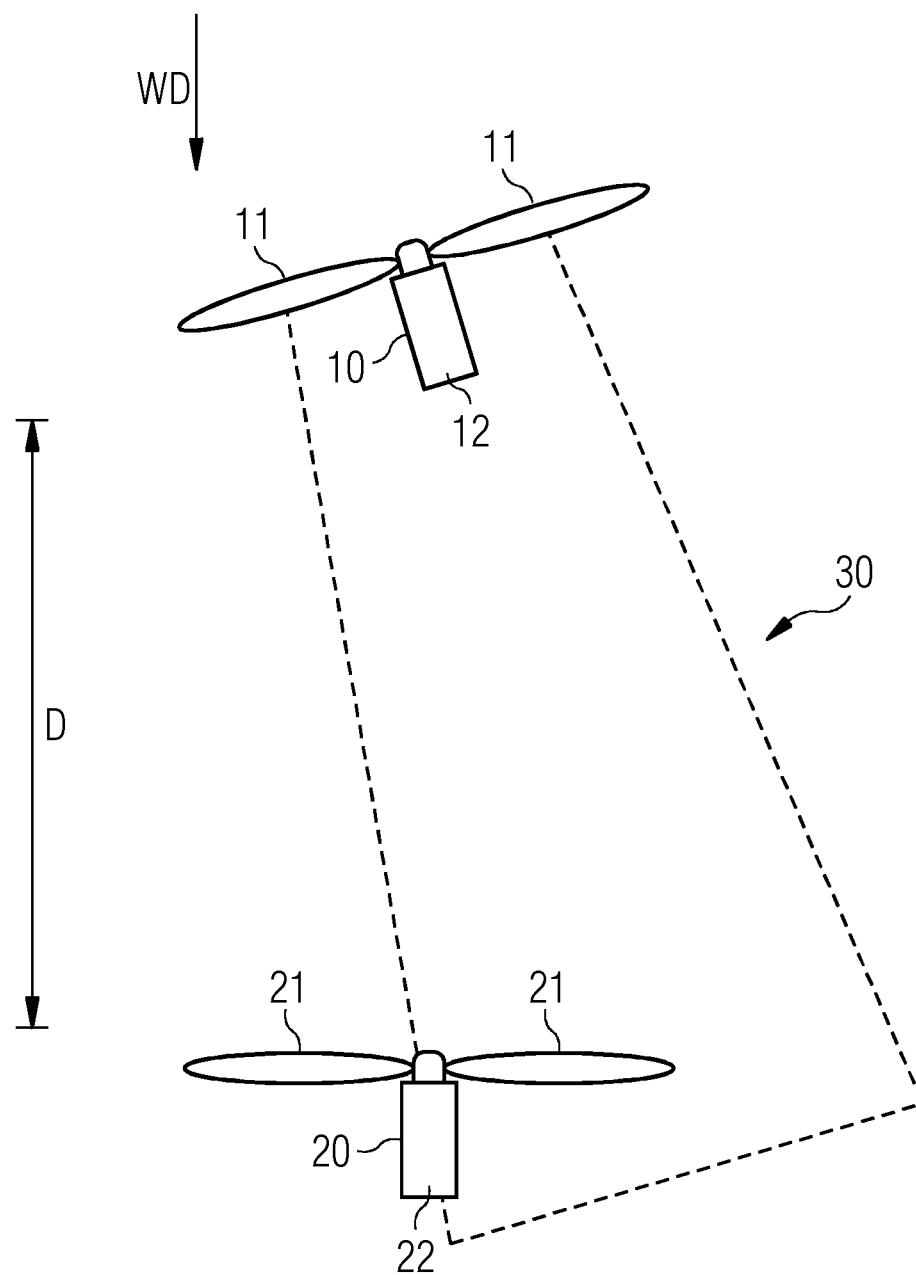

The method includes the steps of: a) providing a data driven model trained with a machine learning method and stored in a database, b) determining a decision parameter for controlling at least one of the upstream turbine and the downstream turbine by feeding the data driven model with the current power production of the upstream turbine which returns a prediction value indicating whether the downstream turbine will be affected by wake, and/or the temporal evolvement of the current power production of the upstream turbine; c) based on the decision parameter, determining control parameters for the upstream turbine and/or the downstream turbine.

10 Claims, 4 Drawing Sheets

(51) Int. Cl.
*F03D 7/04* (2006.01)
*F03D 7/02* (2006.01)

(52) U.S. Cl.
CPC ..... *F05B 2270/32* (2013.01); *F05B 2270/321* (2013.01); *F05B 2270/325* (2013.01); *F05B 2270/335* (2013.01)

(56) References Cited

U.S. PATENT DOCUMENTS

| | | | |
|---|---|---|---|
| 2007/0124025 A1 | 5/2007 | Schram et al. | |
| 2010/0153765 A1 | 6/2010 | Judge et al. | |
| 2012/0091713 A1 | 4/2012 | Egedal et al. | |
| 2013/0103202 A1 | 4/2013 | Bowyer et al. | |
| 2013/0221670 A1 | 8/2013 | Yasugi | |
| 2013/0241209 A1 | 9/2013 | Andersen et al. | |
| 2014/0234103 A1* | 8/2014 | Obrecht | F03D 7/0204 416/9 |
| 2015/0345476 A1 | 12/2015 | Gregg et al. | |
| 2016/0230741 A1 | 8/2016 | Brath et al. | |
| 2017/0051723 A1 | 2/2017 | Kjær et al. | |
| 2017/0284368 A1 | 10/2017 | Franke et al. | |
| 2017/0335827 A1 | 11/2017 | Wilson et al. | |
| 2017/0363072 A1 | 12/2017 | Son et al. | |

FOREIGN PATENT DOCUMENTS

| | | |
|---|---|---|
| CN | 103080540 A | 5/2013 |
| CN | 103306896 A | 9/2013 |
| CN | 104794287 A | 7/2015 |
| CN | 105018111 A | 11/2015 |
| CN | 105048444 A | 11/2015 |
| CN | 105221356 A | 1/2016 |
| CN | 105425591 A | 3/2016 |
| CN | 105556117 A | 5/2016 |
| CN | 106062358 A | 10/2016 |
| CN | 106194598 A | 12/2016 |
| CN | 106203695 A | 12/2016 |
| CN | 107250532 A | 10/2017 |
| EP | 2940296 A1 | 11/2015 |
| EP | 3263889 A1 | 1/2018 |
| JP | 5272112 B1 | 8/2013 |
| WO | WO 2016023527 A1 | 2/2016 |
| WO | WO 2016042652 A1 | 3/2016 |
| WO | WO 2017205221 A1 | 11/2017 |
| WO | WO 2018007012 A1 | 1/2018 |

OTHER PUBLICATIONS

Knudsen Torben et al: "Date Driven Modelling of the Dynamic Wake Between Two Wind Turbines*", Proceedings of the 17th World Congress the International Federation of Automatic Control; Seoul, Korea; Jul. 6-11, 2008, vol. 45, No. 16, pp. 1677-1682, XP055490674, Red Hock, NY ISSN: 1474-6670, DOI: 10.3182/20120711-3-BE-2027.00128; ISBN: 978-1-123-47890-7; the whole document; 2012.

T.J. Larsen et al.: Dynamic Wake Meander Model, Wind Energy 2013, pp. 605-624 (published online Oct. 2012).

Ritter Matthias et al: "Neighborhood Effects in Wind Farm Performance: A Regression Approach", Energies, vol. 10, No. 3, p. 365, XP055490651, DOI: 10.3390/en10030365, the whole document; 2017.

Park Jinkyoo et al: "A data-driven, cooperative wind farm control to maximize the total power production", Applied Energy, Elsevier Science Publishers, GB, vol. 165, Dec. 31, 2015 (Dec. 31, 2015), pp. 151-165, XP029400213; 2015.

European Search Report dated Jul. 16, 2018 for Application No. 18153414.0.

International Search Report dated Apr. 17, 2019 for Application No. PCT/EP2019/051059.

Hong Yue et al, "Quantitative analysis of wake effect based on output power efficiency of wind farm", 《高师理 科学刊》第36卷第06期, Jun. 30, 2016.

Li Lixia et al,"Wind farm power improved control based on nonlinear predictive control", Nov. 20, 2017.

Han, Zhonghe et al.: "Numerical Research of Horizontal-Axis Wind Turbine Wake Performance": 1. Key Lab of Condition Monitoring and Control for Power Plant Equipment of Ministry of Education, North China Electric Power University, Baoding 071003, China; 2011.

* cited by examiner

METHOD AND APPARATUS FOR COOPERATIVE CONTROLLING WIND TURBINES OF A WIND FARM

CROSS-REFERENCE TO RELATED APPLICATIONS

This application claims priority to PCT Application No. PCT/EP2019/051059, having a filing date of Jan. 16, 2019, which is based on EP Application No. 18153414.0, having a filing date of Jan. 25, 2018, the entire contents both of which are hereby incorporated by reference.

FIELD OF TECHNOLOGY

The following relates to a method and an apparatus for cooperative controlling wind turbines of a wind farm.

BACKGROUND

A wind farm is a group of wind turbines in the same location, typically comprised of tens to hundreds of turbines spread over a large area. In such wind farms, the wind used for power production passes through multiple turbines in succession. A pair of turbines aligned along a common axis approximately parallel to the current wind direction consists of an upstream turbine, through which an arriving wind front passes first, and a downstream turbine, through which the same wind front passes second.

The distances between the wind turbines of a wind farm are such to minimize mutual interference, which nevertheless cannot be fully avoided. The act of extracting power in the upstream turbine reduces the wind speed and introduces turbulence behind the turbine. The conical area of the altered wind field behind the upstream turbine is called its wake. This wake can be significant enough to affect the downstream turbine, which decreases its power production and negatively impacts its lifetime by increased mechanical loads due to turbulences.

The actual shape of wake caused by the upstream turbine is highly dependent on the complex stochastic nature of the incoming wind field composition, as well as the aerodynamic properties of the turbine itself and its current state of operation. Predicting wake propagation between the upstream and downstream turbines and its implications on the performance of the latter is therefore a difficult task.

Conventionally, for a given wind condition, an individual wind turbine maximizes its own power production without taking into consideration the conditions of other wind turbines. Under this greedy control strategy, the wake formed by the upstream wind turbine, resulting in reduced wind speed and increased turbulence intensity inside the wake, affects the power production of the downstream wind turbine. To increase the overall wind farm power production, cooperative wind turbine control approaches have been proposed to coordinate control actions that mitigate the wake interference among the wind turbines and can thus increase the total wind farm power production.

Realizing that interactions among wind turbines can have impact on the overall power production, cooperative control approaches have been proposed to maximize the total energy production of a wind farm by manipulating the wake interference pattern. There are cooperative control approaches that find the optimum control actions by optimizing analytical wind farm power functions that mathematically relate control inputs of wind turbines and the total power production of a wind farm. Analytical wind farm power functions are often constructed based on simplified wake models, e.g., the Jensen wake model. Such simple wake models do not accurately reflect the conditions of a wind farm site or a wind turbine model.

To overcome the limitations of simplified wind farm power functions, high-fidelity Computational Fluid Dynamics (CFD) simulation may be used to construct the parametric wind farm power function. The constructed wind farm power function is then used to derive optimal yaw-offset angles of wind turbines. However, a CFD model itself requires the specification of a large number of parameters representing the environmental and wind turbine conditions.

To avoid the use of the wind farm power functions, data driven optimization methods have been suggested, such as that in the publication J. Park, K. H. Law "A data driven, cooperative wind farm control to maximize the total power production", Applied Energy 165 (2016), p. 151-165. However, even the method described in this publication relies on a physical model for validation of the method described.

All approaches imply large computational cost. In order to make these computations feasible, the assumptions about the physical system have to be simplified, for example, by considering only stationary solutions or neglect surface interactions of the wake region. Because of such simplifications, and the fact that most existing models only provide time-independent solutions, it is not possible to use the models to derive short-term adjustments of turbine controllers which can dynamically react to wake effects.

Further, current approaches assume wake to be of conical shape behind the upstream turbine. However, neither the upstream nor the downstream turbine currently reacts dynamically on wake due to the static character of this information.

In the publication T. Knudsen et al.: "Data Driven Modelling of the Dynamic Wake Between Two Wind Turbines", PROCEEDINGS OF THE 17TH WORLD CONGRESS THE INTERNATIONAL FEDERATION OF AUTOMATIC CONTROL; SEOUL, KOREA; July 6-11, 2008., vol. 45, no. 16, 1 Jul. 2012, pages 1677-1682, a data driven modelling of a dynamic extension to the well-known Jensen wake model considering that the wake has to travel with the flow from an upstream turbine to a downstream turbine resulting in a time delay is disclosed. The purpose of the model is to predict the relevant wind speed at the downwind turbine from measurements from the upwind turbine. The considered relevant wind speed is the so-called effective wind speed that gives a similar behavior when applied to the whole rotor instead of the wind speed in one point in the rotor area.

EP 2940296 A1 discloses a method for optimizing operation of a wind farm. A farm control sub-system uses a farm-level predictive wake model to adjust the control settings of wind turbines to maximize the farm-level power output in view of varying ambient conditions. In one embodiment, the farm control sub-system uses a regression model across segregated values corresponding to a reference set to determine set-wise historical wake models for different combinations of wake parameters. The regression model employs machine learning to determine a statistical relationship between values of one or more selected wake parameters and a prevailing wind speed at direction at the upstream and downstream wind turbines in each reference set. In particular, the farm control sub-system fits the regression model across segregated values corresponding to each reference set using a relation between the wind speed at the downstream wind turbine and the wind speed at the upstream turbine. In this relation, a relative distance between the upstream and the downstream wind turbine is considered, among others. The relation is used to define a transfer function that allows prediction of a set-wise wake interaction as a ratio of wind velocity at the downstream wind turbine to the wind velocity at the upstream wind turbine. The regression model estimates the ratio as function of the relative distance between the two turbines.

SUMMARY

An aspect relates to a method and an apparatus for cooperative controlling wind turbines of a wind farm enabling short-term adjustments of turbine controllers to be able to dynamically react to wake effects.

According to a first aspect, a method for cooperative controlling wind turbines of a wind farm is suggested. The wind farm comprises at least one pair of turbines aligned along a common axis approximately parallel to a current wind direction and consisting of an upstream turbine and a downstream turbine. The method comprises the step of providing a data driven model trained with a machine learning method and stored in a database, the data driven model providing a correlation between time series data obtained of the pair of turbines in parallel, the time series data being aligned in time to the same wind front, and ratio of the current power production of the upstream and the downstream turbine related to the aligned time series data. The method comprises the step of determining a decision parameter for controlling at least one of the upstream turbine and the downstream turbine by feeding the data driven model with the current power production of the upstream turbine which returns, as the decision parameter, a prediction value indicating whether the downstream turbine will be affected by wake or not, and/or the temporal evolvement of the current power production of the upstream turbine which returns, as the decision parameter a prediction of the probable development of the future power production of the downstream turbine. The method further comprises the step of determining control parameters based on the decision parameter for the upstream turbine in order to avoid or mitigate wake effects at the downstream turbine, and/or for the downstream turbine in order to mitigate expected negative effects of the downstream turbine with respect to fatigue.

According to a second aspect, an apparatus for cooperative controlling wind turbines of a wind farm is suggested. The wind farm comprises at least one pair of turbines aligned along a common axis approximately parallel to a current wind direction and consisting of an upstream turbine and a downstream turbine. The apparatus comprises a database adapted to store a data driven model trained with a machine learning method and stored in a database, the data driven model providing a correlation between time series data obtained from the pair of turbines in parallel, the time series data being aligned in time to the same wind front, and a ratio of the current power production of the upstream and downstream turbine related to the aligned time series data. The apparatus further comprises a data analyzer adapted to determine a decision parameter for controlling at least one of the upstream turbine and the downstream turbine by feeding the data driven model with the current power production of the upstream turbine which returns, as the decision parameter, a prediction value indicating whether the downstream turbine will be affected by wake or not, and/or the temporal involvement of the current power production of the upstream turbine which returns, as the decision parameter, a prediction of the probable development of the future power production of the downstream turbine. The apparatus further comprises a configurator adapted to determine control parameters, based on the decision parameter, for the upstream turbine in order to avoid or mitigate wake effects at the downstream turbine, and/or for the downstream turbine to mitigate expected negative effects of the downstream turbine with respect to fatigue.

According to embodiments of the invention, dependencies between the upstream and the downstream turbines are modeled without any physical assumptions or numeric simulations, therefore eliminating most of computational costs. Instead, these dependencies are learnt using a machine learning method. By way of a machine learning method, the ratio of the current power production (short:power ratio) of the downstream and the upstream turbines can be predicted. This power ratio is used as a wake indicator, since the power production of two identically constructed turbines is mostly dependent on the wind speed at the turbine blades. In absence of the wake, the two turbines are expected to generate comparable amounts of power when being exposed to the same current wind condition, while wake effects decrease the power production of the downstream turbine.

The dependency between the ratio of current power production and the current condition is learnt using time series data obtained from two or more turbines in parallel, i.e. data acquisition is made at the same time. The observations obtained from the upstream and the downstream turbines are aligned in time to improve the predictive power of the data driven model because it has been recognized that the ratio of the current power production may be used as a reliable wake indicator if the power production of the upstream and the downstream turbine is compared based on the same wind front. This is due to the stochastic nature of the wind that introduces considerable fluctuations in power generation. Due to the distance between the upstream and the downstream turbines, the wind needs time to travel from one turbine to the other. Hence aligning the time series in time comprises the introduction of a time delay in the observations of the same wind front at the two different turbines. Aligning the time series data obtained from the pair of turbines ensures that the power production of the two turbines is compared based on the same wind front.

The present approach applies machine learning to wake prediction which is traditionally tackled using expensive numerical simulations of underlying fluid dynamics in a complex setting. The suggested approach relies on a pre-processing step—the time alignment—which is used to build meaningful targets prior to applying machine learning methods to model the expected future power ratio of current power production between the downstream and the upstream turbines. The time delays themselves are a dynamic property of the current wind condition and may be approximated using expert knowledge. Compared to known physical models, the suggested data driven approach has a number of advantages:

The trained wake-predictors (i.e., the ratio of the current power production of the upstream and the downstream turbine related to aligned time series data) are computationally cheap to evaluate and are able to estimate changes in wake seconds to minutes into future. These short-term estimates are not available using area dynamic models and can be used to determine control parameters of the upstream or downstream turbine that increase the electrical energy production of the downstream turbine and/or reduce fatigue of the downstream turbine.

The knowledge required from the domain experts is contained to the feature engineering and time delay modelling steps, both of which are easier to become acquainted with and reason about than state of the art physical models.

According to an embodiment, the step of storing time series data comprises storing at least one of the following information about an ambient condition, in particular wind direction, anemometer wind speed, air density, ambient temperature, and so on, the turbines' internal state, in particular the produced power, the current pitch angle, nacelle orientation, nacelle acceleration, rotor orientation, generator speed, and so on, and information about the wind field, in particular current wind speed, measures of turbulence and so on. Usually the wind field information cannot be obtained directly from sensor measurements. Instead, it has to be estimated based on the other data sources mentioned above, for example by a FFT frequency analysis of the nacelle acceleration.

According to a further embodiment, a step of aligning of time series data obtained from the pair of turbines in parallel comprises determining a time delay after which wake is likely to propagate to the downstream turbine. As noted above, this feature relates to the fact that the distance between the upstream and the downstream turbines requires that the wind needs time to travel from one turbine to the other, introducing a time delay in the observations of the same wind front at the two different turbines.

According to a first alternative, as time dependent delay, a constant time lag depending on a wind propagation speed and a distance between the upstream turbine and the downstream turbine is determined. According to this alternative, the wind propagation speed may be approximated by a current wind speed determined at the upstream turbine. The future time lag after which wake modulation is likely to propagate to the downstream turbine can be calculated by dividing the distance between the upstream and the downstream turbine by the measured wind speed at the upstream turbine.

According to a second alternative, as time dependent delay, a variable time lag calculated from a physical model based on the measured wind speed of the upstream and downstream turbines is determined (e.g. as a weighted average). The power ratio at a time position when wake modulation is likely to arrive at the downstream turbine is calculated for each time step of acquired power of the upstream turbine to make a correct alignment when wake modulation is likely to arrive the downstream turbine.

According to a further embodiment, a regression model, in particular a neural network or a Gaussian process, will be applied as machine learning method to obtain the data driven model. The regression model is used to predict the ratio of the current power production of the downstream and upstream turbines. The regression model implicitly models the aerodynamic behavior of the turbines and site-specific irregularities such as unusual terrain. While aerodynamic models have to be adapted to new situations by engineers, transferring the suggested approach between pairs of turbines does not change the modelling assumptions but only requires training the model on different data.

The regression model may retrieve from the database the time series data obtained from the pair of the turbines in parallel for current and past states as input and may be trained against targets of future ratios of power production, where a future horizon is defined by the determined time delay. The regression model uses the current and recent past state observations from the both the upstream and downstream turbines as inputs and is trained against targets of the future power ratio, where the future horizon is defined by the (variable) time delay calculated in the pre-processing step.

In this way, the model is able to learn what the expected power ratio will be at the time when the current wind front has travelled from the location of upstream to the downstream turbine.

The results of the power ratio forecast are thus indicative of the timing and expected impact of an incoming or outgoing wake condition. Depending on the use cases described above, they can be used to adaptively control the downstream turbine to mitigate negative effects on its power production or even to control the upstream turbine to avoid causing a wake in the first place.

According to a third aspect, a computer program product (non-transitory computer readable storage medium having instructions, which when executed by a processor, perform actions) directly loadable into the internal memory of a digital computer, comprising software code portions for performing the steps of the method described herein is suggested when the product is run on a computer. The computer program product may be in the form of a DVD-ROM, a CD-ROM, a USB memory stick and the like. The computer program product may also be in the form of a signal which can be transmitted via a wired or wireless transmission channel.

With embodiments of the present invention, it is therefore possible to automatically obtain control parameters for controlling an upstream and/or downstream turbine of a wind farm. In particular, it is possible to take into account a variable time delay in observations of a wind front at the two different turbines. Regression models implicitly model the aerodynamic behavior of the turbines and site-specific irregularities such as unusual terrain.

BRIEF DESCRIPTION

Figure 2:
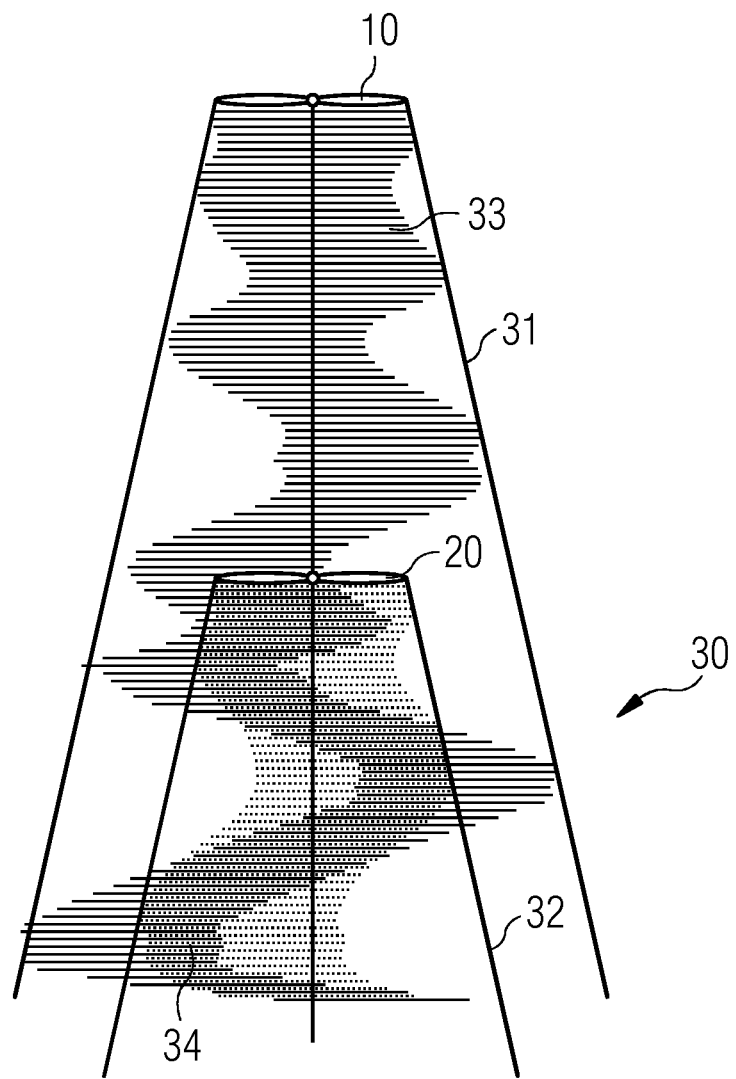
Figure 3:
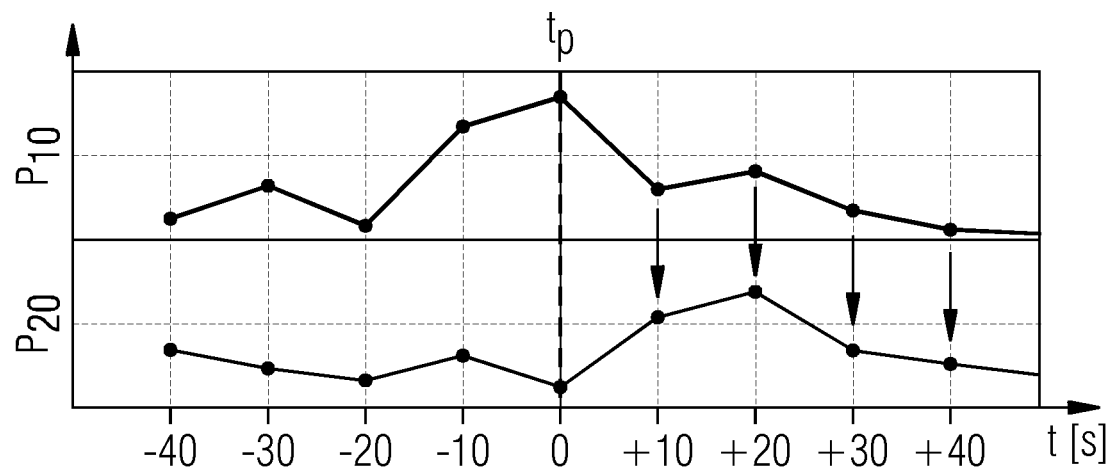
Figure 4:
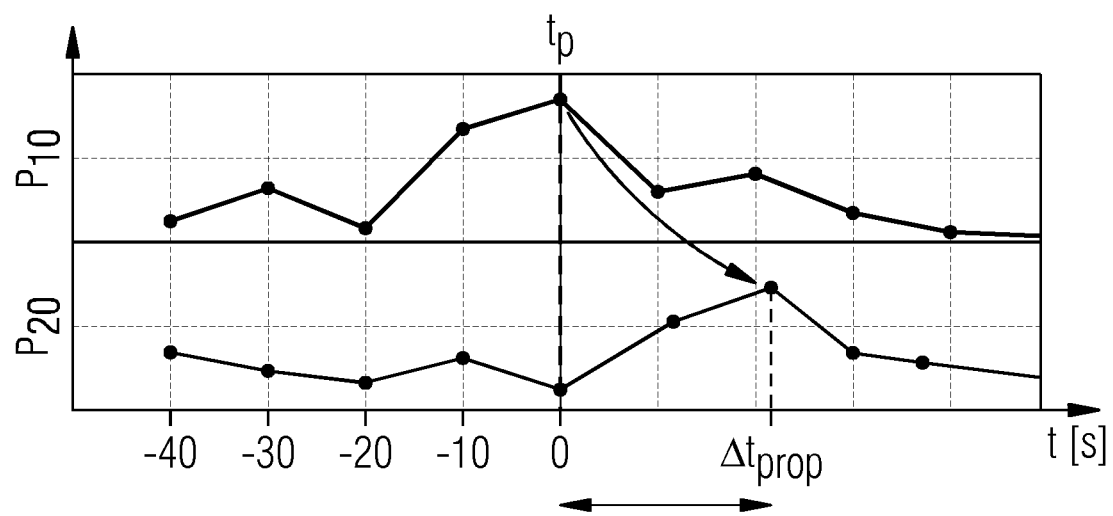
Figure 5:
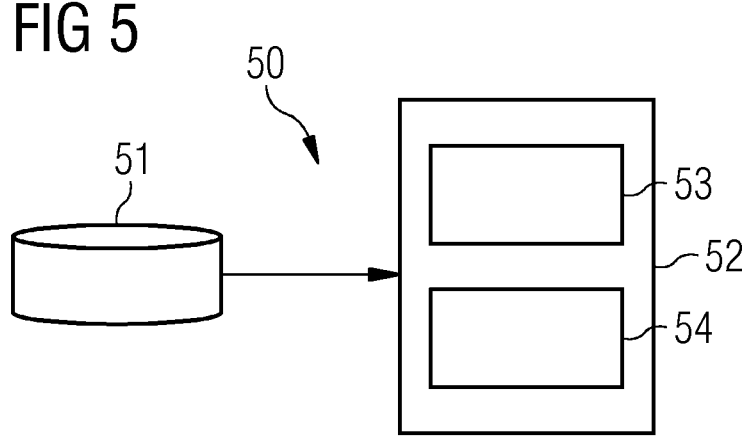
Figure 6:
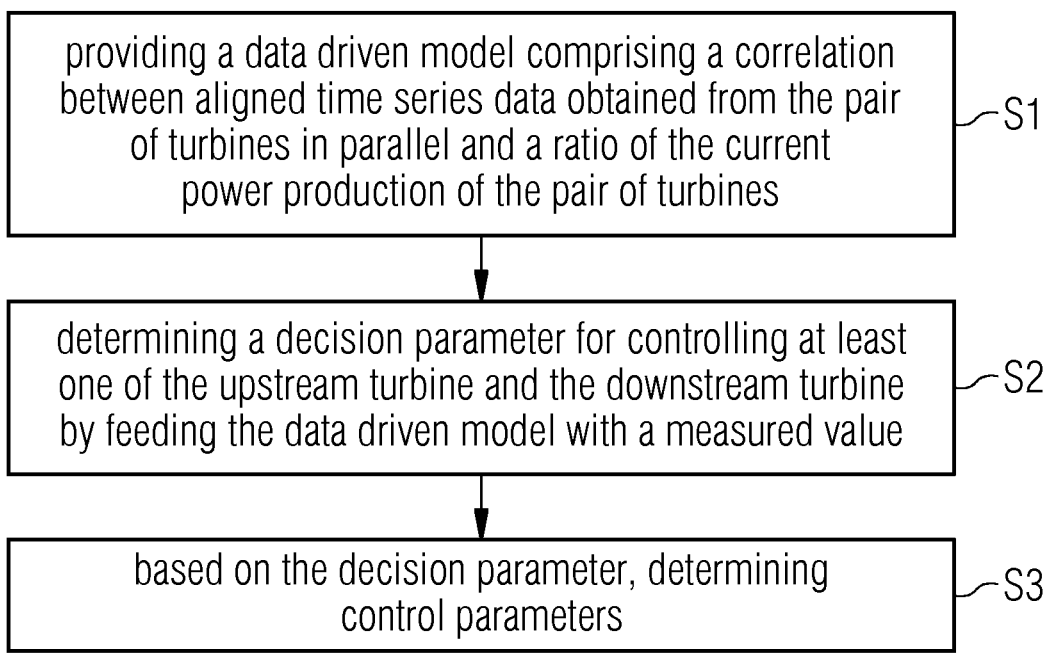

Some of the embodiments will be described in detail, with reference to the following figures, wherein like designations denote like members, wherein:

FIG. 1 shows a schematic diagram of a pair of turbines aligned along a common axis consisting of an upstream turbine and a downstream turbine influencing each other by wake;

FIG. 2 a schematic diagram of a dynamic wake meander model;

FIG. 3 a power-time-diagram illustrating current power productions of the upstream and the downstream turbine over time;

FIG. 4 a power-time-diagram illustrating an alignment of time series data obtained from the pair of turbines enabling calculating a ratio of the current production of the two turbines as wake-indicator;

FIG. 5 a block diagram of an embodiment of an apparatus for cooperative controlling wind turbines of a wind farm; and FIG. 6 a flow diagram of an embodiment of a method for cooperative controlling wind turbines of a wind farm.

DETAILED DESCRIPTION

FIG. 1 shows a pair of turbines 10, 20 aligned to a common axis approximately parallel to a wind direction WD and consisting of the upstream turbine 10 and the downstream 20. With regard to the common axis, the upstream turbine 10 and the downstream 2 are arranged in a distance D to each other. Each of the turbines 10, 20 comprises a number of blades 11, 21 rotating on a nacelle 12, 22 whose angles can be adjusted independently from each other to influence power production. The pair of turbines illustrated in FIG. 1 is a part of a group of wind turbines of a wind farm.

A wind farm is defined as a group of wind turbines in the same location, typically comprised of tens to hundreds of turbines spread over a large area. In such farms, the wind used for power production passes through multiple turbines in succession. In the pair of turbines, illustrated in FIG. 1, an arriving wind front passes through the upstream turbine 10 first and then through the downstream turbine 20 second. The distance D between the turbines is chosen such to minimize mutual interference which nevertheless cannot be fully avoided. Extracting power in the upstream turbine 10 reduces the wind speed and introduces turbulence behind the turbine. A conical area 30 of altered wind field behind the upstream turbine 10 is called its wake. The wake 30 can be significant enough to affect the downstream turbine 20 which decreases its power production and negatively impact its lifetime by increased wear.

Modern wind turbines 10, 20 allow adjusting the blade pitch angle, the yaw angle of the nacelle 12, 22 and the generator torque to maximize the power production and to protect the mechanical and electrical components from excessive structural or electrical loads. Not only affecting its own power production, these control actions can influence the power productions of the downstream wind turbine 20, e.g. by changing the wake characteristics of the wind flow as illustrated in FIG. 1. In FIG. 1, the yaw angle of the upstream turbine 10 is altered to deflect the wake 30 at least partly around the downstream turbine 20. It is to be noted that FIG. 1 shows the deflection merely in a simplified way to illustrate the principle. However, the wake deflection in real would have a different shape. In spite of wake interference, a wind turbine in a wind farm is conventionally operated to maximize its own power production which can possibly lead to lower efficiency on the total power production of the wind farm.

Realizing that the interactions among the wind turbines can have impact on power production, embodiments of the present invention provides a cooperative control approach to maximize the total energy power production of the wind farm by providing control parameters allowing to manipulate wake interference pattern or to protect the mechanical and electrical components, in particular of the downstream turbine 20, from excessive structural or electrical loads and therefore fatigue. To adjust the wake interference pattern, an induction factor and the yaw-offset angle of the upstream turbine may be used. The induction factor, which is determined by the blade pitch angle and the generator torque, is used to determine the power production of the wind turbine, and at the same time, to control the amount of wind speed reduction inside the wake, thereby influencing the energy production of the downstream wind turbine. The yaw-offset angle, defined as the misalignment angle between the wind direction and the rotor, decreases the power production of the upstream turbine 10 but possibly increase the power production of the downstream turbine 20 by deflecting the wake trajectory, as schematically shown in FIG. 1.

For a wind farm, the total power production is simply an aggregation of the powers produced by the wind turbines in the wind farm (in the example of FIG. 1 the two turbines 10, 20). Because of wake interference, the operational condition of the upstream turbine 10 influences the power production of the downstream turbine 20.

The power of a wind turbine due to a wind flow with wind speed U can be expressed as:

$$P = \tfrac{1}{2}\rho A U^3 C_p(\alpha, o)$$

where $\rho$ is the air density and A is the rotor area, $C_p(\alpha, o)$ is termed power coefficient, which is expressed as:

$$C_p(\alpha, 0) = \frac{P}{\rho A U^3 / 2} - 4\alpha(\cos(\beta o) - \alpha)^2$$

where o denotes the yaw-offset angle between the wind direction and the wind turbine rotor, and $\alpha = (U\cos(o) - U_R)/U$ is the induction factor representing the ratio between the wind speed change across the rotor $(U\cos(o) - U_R)$ and the free stream wind speed U. The induction factor $\alpha$ can be controlled by the blade pitch angle and the generator torque to maximize or regulate the power produced by the wind turbine.

FIG. 2, taken from the publication T. J. Larsen et al.: Dynamic Wake Meander Model, Wind Energy (2012), illustrates a schematic view of a dynamic wake meander model of wake 30 caused by the pair of turbines 10, 20. Reference number 31 denotes the wake behind the upstream turbine 10. Within the conical area of altered wind field it can be seen in light grey that the wind front is meandering within the cone 31 thereby hitting the downstream turbine 20 at least partially. Due to the wind front passing through the downstream turbine 20, a conical area of altered wind field behind the downstream turbine is produced which is denoted with reference number 32. As can be seen from the darker grey colored wind front, this wind front is interfering with the wind field of wake 31 of the upstream turbine 10. The actual shape of wake caused by the upstream turbine is highly dependent on the complex and stochastic nature of the incoming wind field composition as well as the aerodynamic properties of the upstream turbine 10 itself and its current state of operation. The interfering wakes 31, 32 of the downstream and the upstream turbine are superimposing each other downstream the downstream turbine 20.

To automatically obtain control parameters for the upstream and/or downstream turbine 10, 20 dependencies between the upstream and the downstream turbines 10, 20 are modelled without physical assumptions or numeric simulations. This eliminates computational costs. Dependencies are learnt using usual regression models from machine learning, such as neural networks or Gaussian processes. The regression models predict the ratio of current power production of the downstream and the upstream turbines. In FIGS. 3 and 4 that illustrate the temporal evolvement of the generated power or the pair of turbines 10, 29 of FIG. 1, the power of the upstream turbine is denoted with P10 and the power production of the downstream turbine 20 is denoted with P20. The power ratio P20/P10 is a wake indicator, since the power production of two identically constructed turbines is mostly dependent on the wind speed at the turbine blades 11, 21. In absence of wake, the upstream and the downstream turbines 10, 20 are expected to generate comparable amounts of power when being exposed to the same current wind condition while wake effects decrease the power production of the downstream turbine.

The regression models are learnt using time series data obtained from the two turbines 10, 20 in parallel. This data contains information about the ambient condition, such as temperature, the turbines' internal state, such as the current pitch angle or nacelle orientation, and wind speed or measures of turbulence. Features like the turbulence estimations cannot be obtained directly from sensor measurements but have to be engineered using techniques from signal processing, for example, aggregations or frequency analyses.

FIG. 3 shows a power-time-diagram where the current generated power P10, P20 of the upstream turbine 10 and the downstream turbine 20, constituting time series data, are arranged over each other during the time of calculation or acquisition. However, the current power production, for example at time $t_p$, does not refer to the same wind front, since at time $t_p$ different wind fronts are passing through the upstream and the downstream turbines 10, 20. Hence, as a pre-processing step, the observations obtained from the upstream and the downstream turbines 10, 20 are aligned in time to improve the predictive power of the model.

The power ratio is then used as wake indicator since the power production of the two turbines 10, 20 is compared based on the same wind front, since the stochastic nature of the wind introduces considerable fluctuations in power generation. Due to the distance D between the upstream and the downstream turbines 10, 20, the wind needs time to travel from the upstream turbine 10 to the downstream turbine 20, introducing a variable time delay in the observations of the same wind front at the two different turbines 10, 20. In general, the time delays themselves are a dynamic property of the evolution of the wind field, and thus, are time dependent. They can be approximated with different levels of detail.

As a first alternative, a constant delay specified by a domain engineer and based on the wind farm topological layout may be used. According to that alternative the constant time lag depends on (an average) wake propagation speed and the distance D between the upstream turbine 10 and the downstream turbine 20.

As a second alternative, the wake propagation speed $v_{prop}$ may be approximated by the current wind speed at the upstream turbine 10 and downstream turbine 20, for example as a weighted average. The future time lag $\Delta t_{prop}$ after which the wake modulation is likely to propagate to the downstream turbine 20:

$$\Delta t_{prop} = D/v_{prop}$$

As a further example, a variable delay calculated from a physical model based on a measured wind speed of the upstream turbine 10 can be used. The principle procedure is shown in the power-time-diagram of FIG. 4 where again the current generated power P10, P20 of the upstream and the downstream turbine 10, 20 over time is illustrated. Starting from a present time $t_p$ where wind passes through the upstream turbine 10, it takes a variable time $\Delta t_{prop}$ until this wind front propagates to the downstream turbine 20. The dynamic power ratio DPR at the time position when wake modulation is likely to arrive at the downstream turbine may be calculated by $$DPR(t+\Delta t_{prop}) = P20(t+\Delta t_{prop})/P10(t=t_p).$$

It is to be understood that the time delay $\Delta t_{prop}$ is different for each time. Accordingly, prediction of $\Delta t_{prop}$ is part of prediction of the machine learning method.

The regression models use the current and recent past state observations from both the upstream and downstream turbines 10, 20 as inputs and are trained against targets of future power ratio P20/P10, where the future horizon is defined by the variable time delay $\Delta t_{prop}$ calculated in the pre-processing step. In this way, the models are able to learn what the expected power ratio P20/P10 will be at a time when the current wind front has travelled from the location of the upstream turbine 10 to the downstream turbine 20.

The results of the power ratio forecast are thus indicative of the timing and expected impact of an incoming or outgoing wake condition. Depending on the use cases described above, they can be used to adaptively determine control parameters for the downstream turbine 20 to mitigate negative effects, for example by predicting a desired yaw-offset angles and/or pitch angles and/or generator torque. Alternatively or additionally, control parameters may be determined to control the upstream turbine 10 to avoid causing a wake thus decreasing a possible power production of the downstream turbine.

FIG. 5 illustrates a schematic diagram of an apparatus 50 for cooperative controlling the wind turbines 10, 20. The apparatus 50 comprises a database 51 adapted to store a data driven model trained with a machine learning method and stored in the database 51. The data driven model provides a correlation between acquired time series data obtained from the pair of turbines in parallel (i.e. at the same time), the time series data being aligned in time to the same wind front and a ratio of the current power production of the upstream and the downstream turbine related to the aligned time series data. The apparatus furthermore comprises a calculating unit 52 consisting of a data analyzer 53 and a configurator 54. The data analyzer 53 is adapted to determine a decision parameter for controlling at least one of the upstream turbine 10 and the downstream turbine 20 by feeding the data driven model with a current power production of the upstream turbine 10 which returns, as the decision parameter, a prediction value indicating whether the downstream turbine will be effected by wake and/or the temporal evolvement of the current power production of the upstream turbine 10 which returns, as the decision parameter, a prediction of the probable development of the future power production of the downstream turbine. The configurator 54 is adapted to determined control parameters, based on the decision parameter, for the upstream turbine in order to avoid or mitigate wake effects at the downstream turbine and/or for the downstream turbine in order to mitigate expected negative effects of the downstream turbine with respect to fatigue (electrical and mechanical stress).

FIG. 6 illustrates a flow chart of a method for cooperative controlling wind turbines of a wind farm. In step S1, a data driven model comprising a correlation between aligned time series data obtained from the pair of turbines in parallel and a ratio of the current power production of the pair of turbines is provided. In step S2, a decision parameter for controlling at least one of the upstream turbine and the downstream turbine by feeding the data driven model with a measured value is determined. In step S3, based on the decision parameter, control parameters are determined.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for cooperative controlling wind turbines of a wind farm, wherein the wind farm comprises at least one pair of turbines aligned along a common axis approximately parallel to a current wind direction and having an upstream turbine and a downstream turbine, comprising the steps of:

a) providing a data driven model trained with a machine learning method and stored in a database, the data driven model providing a correlation between time series data obtained from the pair of turbines in parallel, the time series data being aligned in time to the same wind front by introducing a time delay, and a ratio of the current power production of the upstream and the downstream turbine related to the aligned time series data;

b) determining a decision parameter for controlling at least one of the upstream turbine and the downstream turbine by feeding the data driven model with
the current power production of the upstream turbine which returns, as the decision parameter, a prediction value indicating whether the downstream turbine will be affected by wake, and/or the temporal evolvement of the current power production of the upstream turbine which returns, as the decision parameter, a prediction of the probable development of the future power production of the downstream turbine;

c) based on the decision parameter, determining control parameters
for the upstream turbine in order to avoid or mitigate wake effects at the downstream turbine; and/or
for the downstream turbine in order to mitigate expected negative effects of the downstream turbine with respect to fatigue.

2. The method according to claim 1, wherein the step of storing time series data comprises storing information about:
an ambient condition, including wind direction, anemometer wind speed, air density, and/or ambient temperature;
a turbines' internal state, including the produced power, current pitch angle, nacelle orientation, nacelle acceleration, rotor orientation, and/or generator speed; and/or
a wind field, including current wind speed and/or measures of turbulence.

3. The method according to claim 1, wherein the time delay is a time lag after which wake is likely to propagate to the downstream turbine.

4. The method according to claim 1 wherein the time delay is a constant time lag depending on a wake propagation speed and a distance between the upstream turbine and the downstream turbine.

5. The method according to claim 4, wherein the wake propagation speed is approximated by a current wind speed determined at the upstream turbine and/or downstream turbine.

6. The method according to claim 1 wherein the time delay is a variable time lag calculated from a physical model based on the measured wind speed of the upstream turbine and/or downstream turbine.

7. The method according to claim 1, wherein a regression model, in particular a neural network or Gaussian process, will be applied as machine learning method to obtain the data driven model.

8. The method according to claim 7, wherein the regression model retrieves from the database the time series data obtained from the pair of turbines in parallel for current and past states as input and is trained against targets of future ratios of power production, where a future horizon is defined by the time delay.

9. A computer program product, comprising a computer readable hardware storage device having non-transitory computer readable program code stored therein, said program code executable by a processor of a computer system to implement the steps of claim 1.

10. An apparatus for cooperative controlling wind turbines of a wind farm, wherein the wind farm comprises at least one pair of turbines aligned along a common axis approximately parallel to a current wind direction and consisting of an upstream turbine and a downstream turbine, comprising:
a database adapted to store a data driven model trained with a machine learning method and stored in a database, the data driven model providing a correlation between time series data obtained from the pair of turbines in parallel, the time series data being aligned in time to the same wind front by introducing a time delay, and a ratio of the current power production of the upstream and the downstream turbine related to the aligned time series data;
a data analyzer adapted to determine a decision parameter for controlling at least one of the upstream turbine and the downstream turbine by feeding the data driven model with
the current power production of the upstream turbine which returns, as the decision parameter, a prediction value indicating whether the downstream turbine will be affected by wake, and/or
the temporal evolvement of the current power production of the upstream turbine which returns, as the decision parameter, a prediction of the probable development of the future power production of the downstream turbine;
a configurator adapted to determine control parameters, based on the decision parameter,
for the upstream turbine in order to avoid or mitigate wake effects at the downstream turbine; and/or
for the downstream turbine in order to mitigate expected negative effects of the downstream turbine with respect to fatigue.

* * * * *